United States Patent [19]
Smith

[11] 3,819,020
[45] June 25, 1974

[54] FLUID OPERATED STARTING CLUTCH WITH CENTRIFUGALLY ACTUATED CONTROL VALVES

[75] Inventor: Lyle B. Smith, Westland, Mich.

[73] Assignee: General Motors Corporation, Detroit, Mich.

[22] Filed: Oct. 2, 1972

[21] Appl. No.: 293,927

[52] U.S. Cl. .... 192/103 FA, 192/85 AA, 192/85 F, 192/113 B
[51] Int. Cl. F16d 43/06, F16d 25/063, F16d 13/74
[58] Field of Search............ 192/85 F, 113 B, 85 R, 192/103 FA, 85 AA

[56] References Cited
UNITED STATES PATENTS

| | | | |
|---|---|---|---|
| 2,521,239 | 9/1950 | McDowall et al. | 192/113 B |
| 2,556,809 | 6/1951 | Hobbs | 192/103 FA |
| 3,064,779 | 11/1962 | Christenson | 192/113 B X |
| 3,282,385 | 11/1966 | Snyder | 192/103 FA |
| 3,712,437 | 1/1973 | Snyder | 192/103 FA |

*Primary Examiner*—Samuel Scott
*Assistant Examiner*—Lance W. Chandler
*Attorney, Agent, or Firm*—D. F. Scherer

[57] ABSTRACT

A fluid operated starting clutch in which the apply chamber pressure is controlled by an apply restriction control valve and an exhaust restriction control valve. The control valves are responsive to the input rotational speed of the clutch in such a manner as to provide a speed differential between opening of the apply restriction and closing of the exhaust restriction so that smooth clutch apply is obtained. The exhaust restriction control valve has a differential area subject to apply pressure in the clutch to substantially balance the centrifugal force therein during the clutch apply period.

3 Claims, 1 Drawing Figure

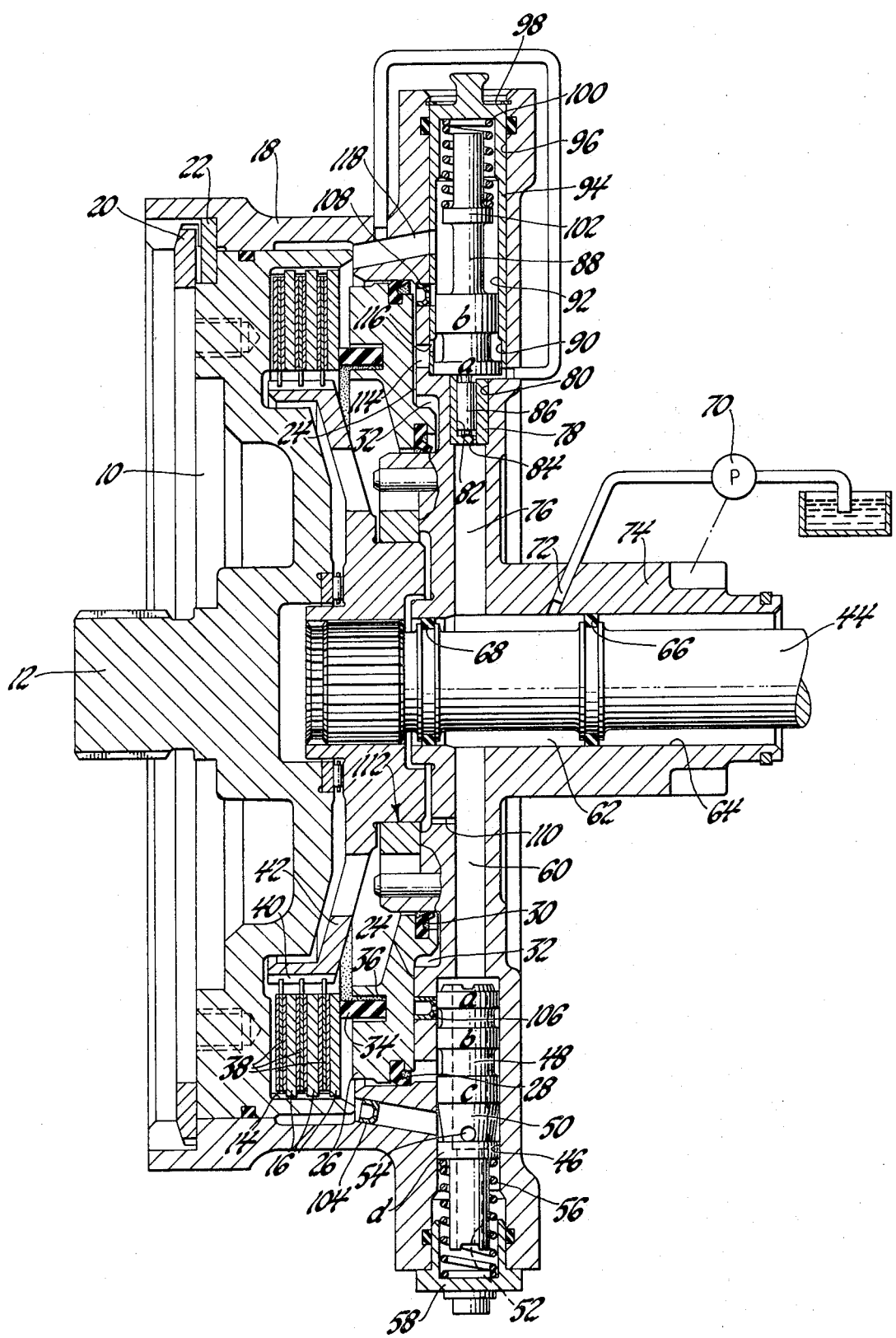

FLUID OPERATED STARTING CLUTCH WITH CENTRIFUGALLY ACTUATED CONTROL VALVES

This invention relates to fluid operated clutches and controls and more particularly to fluid operated starting clutches having centrifugally actuated control valves.

Starting clutches used with automotive vehicles are required to slip during initial engagement thereof to permit the engine power to be transmitted gradually to the vehicle drive line. This slipping condition allows the engine to accelerate while the vehicle is starting. The present invention provides for the slipping condition through the use of a pair of centrifugally operated valves one of which controls a restricted passage which supplies pressurized fluid to the apply chamber of the clutch while the other centrifugal valve controls a restricted passage which exhausts the supply chamber. The restricted apply passage has a less restrictive value than the restricted exhaust passage so that during the clutch apply period when both passages are open fluid pressure will develop in the clutch apply chamber at a predetermined rate, since the apply restriction will admit more fluid to the apply chamber than can be exhausted through the exhaust restriction.

The exhaust control valve has a hysteresis or differential area portion which is in fluid communication with the clutch apply chamber such that fluid pressure in the clutch apply chamber acting on the exhaust valve differential resists the centrifugal force on the valve. When the clutch apply pressure is equal to the system line pressure the force on the exhaust valve resisting the centrifugal force will be maximum such that the further increase and the centrifugal force due to increased clutch input speed will cause the exhaust valve to shift thereby closing the exhaust passage.

The clutch apply valve operates at a predetermined clutch input speed to open the restricted apply passage to system line pressure and also to supply lubrication fluid to the clutch friction discs during the initial engagement of the clutch. The clutch apply valve has a tapered control surface thereon which closes the lubrication passage to the clutch simultaneously with or slightly after full clutch engagement.

It is an object of this invention to provide in an improved starting clutch, a centrifugally operated apply valve responsive to input clutch speed to open a connection between system pressure and a restricted apply passage to the clutch apply chamber and a centrifugally operated exhaust valve responsive to the input speed of the clutch for closing the restricting exhaust passage from the apply chamber.

It is another object of this invention to provide in an improved starting clutch, a centrifugally operated apply valve for admitting apply pressure to the clutch and a centrifugally operated exhaust valve for controlling exhausting of the clutch which exhaust valve includes a hysteresis area open to the clutch apply chamber such that apply pressure generates a force on the exhaust valve which counterbalances the centrifugal force on the exhaust valve until the apply pressure of the clutch is at its maximum value.

It is another object of this invention to provide in an improved starting clutch a centrifugally operated apply valve responsive to clutch input speed to control clutch apply pressure and clutch lubrication fluid flow and a centrifugally operated exhaust control valve for controlling fluid flow from the fluid clutch apply chamber.

It is a further object of this invention to provide in an improved starting clutch, a centrifugally operated apply valve for controlling fluid flow to the apply chamber, a centrifugally operated exhaust valve for controlling fluid flow from the apply chamber and a clutch piston movable in responsive to the fluid pressure in the apply chamber and having an elastomeric member to provide an accumulator effect on the fluid pressure in the apply chamber during clutch engagement.

These and other objects and advantages will be more apparent from the following description and drawing which is a cross-sectional elevational view of the starting clutch and control valves.

Referring to the drawing, there is shown an input hub 10 having a spline portion 12 adapted to be connected to a prime mover, such as a gas turbine engine, not shown, and an internal spline portion 14 to which is splined a plurality of friction discs 16. A housing 18 is positioned in the input hub 10 by a locking ring 20 and a key 22. The housing 18 has an arcuate recess 24 formed therein in which is slidably disposed an arcuate piston 26 having seals 28 and 30 secured to the outer and inner peripheries respectively. The seals 28 and 30 are in abutting relationship with the inner and outer cylindrical walls of the arcuate recess 24 and cooperate therewith to provide a fluid tight chamber 32. The piston 26 also has an elastomeric member 34 secured in an arcuate groove 36 which member 34 abuts one of the friction discs 16.

A plurality of friction discs 38 are interleaved with the friction discs 16 and have splined inner diameters which engage a spline 40 formed on a output hub 42. Output hub 42 is splined to a clutch output shaft 44 which is adapted to be connected to a conventional multi-ratio transmission or similar drive train.

The housing 18 also includes a bore 46 in which is slidably disposed a valve spool 48 having a plurality of lands $a$, $b$, $c$, and $d$. A portion 50 of valve 48 between lands c and d has a tapered configuration and is in fluid communication with a through bore 52 in valve 48 by a cross-drilled passage 54. The valve spool 48 is urged radially inward in bore 46 by a bias spring 56 which is compressed between valve land $d$ and a valve seat 58 secured in the housing 18. The end of bore 46 adjacent land a is in fluid communication with a passage 60. The passage 60 is open to an annular chamber 62 formed between the clutch output shaft 44 and a bore 64 in the housing 18 by a pair of seals 66 and 68 which are retained in grooves on the shaft 44. Fluid pressure is supplied to the chamber 62 from a conventional pump 70 via passage 72. The pump 70 is adapted to be driven by a hub 74 formed on the housing 18.

The annular chamber 62 is also in fluid communication with a passage 76 formed in the housing 18. The radially outward end of passage 76 is closed by the plug 78 secured in a bore 80 formed the housing 18. Fluid communication between the passage 76 and a bore 82 formed in a plug 78 is provided through a small passage 84. A plug valve 86 is slidably disposed in a bore 82 the radially outer end of which abuts a valve spool 88. The valve spool 88 has a large diameter land a and a smaller land b which are slidably disposed in bores 90 and 92 respectively which bores are formed in a cup shaped member 94. The member 94 is secured in a bore 96 in the housing 18 by a snap ring 98. The valve spool 88 is urged radially inward by a spring 100 compressed between a spring seat 102 formed on valve 88 and the cup shaped member 94. The housing 18 has secured therein a lube restriction 104, an apply restriction 106 and a exhaust restriction 108. The apply restriction 106 and exhaust restriction 108 are both in fluid communication with the chamber 32 while the lube restriction 104 is in fluid communication with the friction plates 16 and 38.

The housing 18 also has a lube restriction passage 110 that provides fluid communication between passage 60 and a one way device, generally designated, 112 which is disposed between the housing 18 and the hub 42. The one way device 112 is operable to provide a back drive between the shaft 44 and the input hub 10 when the shaft 44 is being driven by the vehicle, such as during coasting. The housing 18 also has a passage 114 in fluid communication with the area between land a and b on valve 88 via passage 116 formed in the cup shaped member 94. The passages 114 and 116 permit fluid pressure in the chamber 32 to act on the differential area between lands a and b of the valve spool 88.

OPERATION

When the engine is operating, the hub 10, housing 18 and therefore pump 70 will be driven by the engine. The pump 70 delivers fluid via passage 72 to the chamber 62. The fluid in chamber 62 is delivered via passage 60 and through bore 52 through both ends of valve spool 48 and also via the cross-drilled passage 54 to the lube restriction 104. The lube restriction 104 permits fluid to be delivered to the friction plates 16 and 38 to provide lubrication therefore. Since the fluid pressure acts on both ends of the valve spool 48, the valve spool is substantially pressure balanced. Assuming that the input speed of the clutch is less than the desired starting speed, the apply restriction 106 will be closed by valve land a of valve 48 so that no fluid pressure is admitted to the chamber 32 to apply the clutch piston 26.

Fluid pressure in chamber 62 is also communicated via passages 76 and 84 to the valve bore 82 where the fluid pressure acts on the valve plug 86. The spring 100 is designed to maintain the valve 88 in its radially inward position, as shown, against the pressure force applied by fluid pressure acting on plug valve 86 therefore the restricted exhaust passage 108 is open to an exhaust passage 118 to insure that no fluid pressure develops in the chamber 32. As the speed of the clutch input increases the valve spool 48 will move radially outward in its valve bore thereby opening the restricted apply passage 106 at a predetermined input speed. When the restricted apply passage 106 is open fluid pressure will develop in the chamber 32, however, this fluid pressure development will be gradual since the restricted exhaust passage 108 remains open to permit some fluid to be exhausted from the chamber 32. The fluid pressure in chamber 32 at this time, will begin to develop and cause the piston 26 to move the friction discs 16 and 38 into abutting relationship. The elastomeric member 34 assists in permitting gradual application of the clutch piston 26 since the member 34 distorts to act as an accumulator. The fluid pressure developing in chamber 32 is also communicated to the differential area between the valve lands a and b of valve 88. The pressure acting thereon retards the movement of valve spool 88 which might otherwise occur because of the centrifugal force acting on the valve. As the clutch input speed continues to increase, and the clutch output speed will also increase as the clutch apply pressure continues to rise. When the fluid pressure in the chamber 32 is equal to the pressure supplied by the pump 70, the force acting on the differential area between valve lands a and b of valve spool 88 will be equal to the force acting on the valve plug 86. At this time, the valve spring 100 will oppose the centrifugal force acting on the valve 88. A further increase in input speed of the clutch will permit the centrifugal force acting on valve 88 to overcome the force in spring 100, such that the valve spool 88 will move radially outward, so that valve land b will close the exhaust restriction 108 and the clutch will be fully applied. Also during the increase of input speed the valve spool 48 continues to move radially outward such that the tapered land 50 will slowly decrease the amount of fluid supply for lubrication. This tapered land is designed such that the lubrication flow to the clutch plates 16 and 38 will be terminated at a clutch input speed equal to or slightly higher than the clutch input speed at which the exhaust valve 88 closes the exhaust restriction 108. Thus the clutch plates 16 and 38 receive lubrication and cooling during clutch engagement when heat generated therein is maximum.

Obviously, many modifications and variations are possible in the light of the above teachings. It is, therefore, to be understood that within the scope of the appended claims, the invention may be practiced otherwise than as specifically described.

What is claimed is:

1. A starting clutch and control comprising; a fluid operated friction clutch having a clutch apply chamber; apply restriction means in fluid communication with said apply chamber; exhaust restriction means in fluid communication with said apply chamber for exhausting of said apply chamber; a source of fluid pressure; first centrifugally operated valve means operable in response to a predetermined rotational speed of the clutch for providing fluid communication between said apply restriction means and said source of fluid pressure to permit pressurization of said apply chamber; and second centrifugally operated valve means operable in response to another and higher predetermined rotational speed of said clutch for preventing exhausting of said apply chamber through said exhaust restriction means including a hysteresis area means responsive to fluid pressure in said apply chamber for substantially counterbalancing the centrifugal force imposed by said clutch speed on second valve means until said clutch apply chamber is fully pressurized.

2. A starting clutch and control comprising; a fluid operated friction clutch having a clutch apply chamber; apply restriction means in fluid communication with said apply chamber; exhaust restriction means in fluid communication with said apply chamber for exhausting of said apply chamber; a source of fluid pressure; first centrifugally operated valve means operable in response to a predetermined rotational speed of the clutch for providing fluid communication between said apply restriction means and said source of fluid pressure to permit pressurization of said apply chamber and including lube control means operable to supply lube fluid from said source to said clutch during engagement thereof and being responsive to the rotational speed of said clutch to discontinue the supply of lube fluid after the clutch is engaged; and second centrifugally operated valve means operable in response to another and higher predetermined rotational speed of said clutch for preventing exhausting of said apply chamber through said exhaust restriction means including a hysteresis area means responsive to fluid pressure in said apply chamber for substantially counterbalancing the centrifugal force imposed by said clutch speed on said second valve means until said clutch apply chamber is fully pressurized.

3. A starting clutch and control comprising a fluid operated clutch including an input member, an output member, a housing secured to said input member, an apply chamber in said housing, a piston slidably disposed in said housing, and alternately spaced friction discs splined to said input members respectively; a source of fluid pressure; an apply control valve slidably disposed in said housing and being in fluid communication with said source including a plurality of spaced lands and a tapered portion between two of said lands; an exhaust control valve slidably disposed in said housing including a small diameter land and a large diameter land spaced radially inward from said small diameter land; an exhaust passage in said housing in fluid communication with said exhaust control valve; a lube restriction passage in said housing adjacent said tapered portion of said apply control valve; an apply restriction passage in said housing in fluid communication with said apply chamber; an exhaust restriction passage in fluid communication with said apply chamber; and a control passage in fluid communication with said apply chamber and the space between said large and small diameter lands on said exhaust control valve; said apply valve being operable in response to centrifugal force to open said apply restriction passage to said fluid source at a first predetermined input speed of said clutch and to provide fluid communication between said fluid source and said lube restriction passage in a speed range encompassing the first predetermined input speed; said exhaust control valve being operable in response to centrifugal force to close said exhaust restriction passage from said exhaust passage at a second predetermined speed above said first predetermined speed whereby said clutch is applied gradually between said predetermined speed and said space between said large and small diameter lands being subject to pressure in said apply chamber between said predetermined speeds to substantially counterbalance the centrifugal force on said exhaust valve until said second predetermined speed is attained.

\* \* \* \* \*